(12) United States Patent
Wuestefeld et al.

(10) Patent No.: US 10,502,338 B2
(45) Date of Patent: Dec. 10, 2019

(54) PRESSURE VALVE

(71) Applicant: Danfoss Power Solutions GmbH & Co. OHG, Neumünster (DE)

(72) Inventors: Martin Wuestefeld, Neumünster (DE); Reinhardt Thoms, Neumünster (DE)

(73) Assignee: Danfoss Power Solutions G.m.b.H. & Co. OHG, Neumunster (DE)

( * ) Notice: Subject to any disclaimer, the term of this patent is extended or adjusted under 35 U.S.C. 154(b) by 244 days.

(21) Appl. No.: 15/724,717

(22) Filed: Oct. 4, 2017

(65) Prior Publication Data

US 2018/0100603 A1    Apr. 12, 2018

(30) Foreign Application Priority Data

Oct. 11, 2016 (DE) .................. 10 2016 219 720

(51) Int. Cl.
*F16K 31/122* (2006.01)
*F16K 17/04* (2006.01)
*F16K 17/10* (2006.01)

(52) U.S. Cl.
CPC .......... *F16K 31/1221* (2013.01); *F16K 17/04* (2013.01); *F16K 17/105* (2013.01)

(58) Field of Classification Search
CPC .............................. F16K 31/1221; F16K 17/04
See application file for complete search history.

(56) References Cited

U.S. PATENT DOCUMENTS

| | | | |
|---|---|---|---|
| 3,412,756 A | 11/1968 | Shore | |
| 4,629,156 A | 12/1986 | Anderson et al. | |
| 2017/0097103 A1* | 4/2017 | Taya | F16K 31/122 |

FOREIGN PATENT DOCUMENTS

| | | |
|---|---|---|
| CN | 201547360 U | 8/2010 |
| CN | 101925767 A | 12/2010 |

(Continued)

OTHER PUBLICATIONS

Chinese Office Action with English Translation for Serial No. 201710946014.6 dated Dec. 5, 2018.

*Primary Examiner* — P. Macade Nichols
(74) *Attorney, Agent, or Firm* — McCormick, Paulding & Huber PLLC

(57) ABSTRACT

Pressure relief valve (1) comprising a valve housing (2), in which a double-side operable cylindrical pressure relief valve spool (3) is housed slidable along a longitudinal axis (4) of a cylindrical bore (5) in the valve housing (2). The pressure relief valve spool (3) can be shifted into a first position by a first force acting on an actuating side (6) of the pressure relief valve spool (3) and can be shifted into a second position by a pressure force acting on a sealing side (7) of the pressure relief valve spool (3). On the sealing side (7) of the pressure relief valve spool (3) a double-sealing, rotational symmetric poppet (30) is located having a rotational axis (34), a first convex sealing surface (31) and a second convex sealing surface (32). The first sealing surface (31) facing away from the pressure relief valve spool (3) is provided for sealing with an external valve seat (11). The second sealing surface (32) facing to the stepped bore (8) in the valve spool (3) is provided for sealing with the smaller diameter of the stepped bore (8). The poppet (30) and the rotational axis (34) of the poppet (30) are tiltable with respect to the longitudinal axis (4) of the cylindrical bore (5) in the pressure valve housing (2).

20 Claims, 3 Drawing Sheets

(56) References Cited

FOREIGN PATENT DOCUMENTS

| CN | 204226766 U | 3/2015 |
|---|---|---|
| CN | 204328108 U | 5/2015 |
| DE | 1298799 B | 7/1969 |
| JP | H0240170 U | 3/1990 |

* cited by examiner

PRESSURE VALVE

CROSS-REFERENCE TO RELATED APPLICATION

This application claims foreign priority benefits under U.S.C. § 119 to German Patent Application No. 10 2016 219 720.7 filed on Oct. 11, 2016, the content of which is hereby incorporated by reference in its entirety.

TECHNICAL FIELD

The present invention relates to a pressure relief valve comprising a valve housing, in which a double-sided cylindrical valve spool is housed slidable along a longitudinal axis of a longitudinal bore in the valve housing and can be pressurized/forced on both sides.

BACKGROUND

Such pressure valves are known in the art. An example of which is shown in FIG. 1. This type of pressure relief valve is used in hydraulic or pneumatic systems, e.g., to limit the pressure in specific branches or lines of the respective circuits. In order to do so, the pressure relief valve has a housing in which a spool or piston is movable between two limiting positions under the action of a spring and/or pressure forces acting on the spool. In each of these positions the spool opens or closes a particular pathway for fluid under pressure. For closing such a pathway for the fluid a sealing surface of the spool is brought in intimate sealing contact with a corresponding sealing surface, i.e. the valve seat of a fluid conduit or other component of the hydraulic system, e.g. a casing. It is clear that the corresponding sealing surfaces have to be matched carefully and have to be aligned with high precision in order for the pressure relief valve to function properly. Any misalignment or mismatch of the sealing surfaces may lead to pressure losses, leakages and/or other malfunctions of the pressure relief valve or the circuit to which the pressure relief valve is assigned to.

The above prior art solutions have the draw-back that the valve spout and the valve seat, on which the valve spout seals, have to be aligned very precisely in order to prevent malfunctions. In particular, misalignment of the valve spool, for instance due to production tolerances of the mounting position of the valve housing, would lead to leakages at the valve seat if the sealing members cannot be positioned properly to each other. This requires very narrow tolerances in the production of the valve components, in particular the position, parallelism and the concentricity tolerances of the sealing surfaces on the valve spool and the valve seat to each other. Furthermore, this requires very precise production tolerances of the mounting position and the alignment of the valve housing on an installation cavity, e.g. a housing of a hydraulic or pneumatic unit. Naturally, this leads to relatively high costs in the manufacturing process, not only for the valve itself, but also for the hydraulic or pneumatic unit for which such a valve is used.

SUMMARY

It is an object of the present invention to provide a pressure relief valve of the above mentioned kind, which is of simple design and which is capable to compensate production tolerances. A further object is to provide a valve which functions and seals reliably with the associated valve seats, simultaneously requiring less stringent production tolerances for the sealing components.

To that end, according to the present invention a pressure relief valve of the above mentioned kind comprises a double-sealing poppet located on a sealing side of a pressure relief valve spool which is the side of the pressure relief valve which faces an external valve seat in an installation cavity of a hydraulic or pneumatic unit, to which the pressure relief valve is mounted to. For this purpose the poppet is of a rotational symmetrical design with respect to a rotational axis and has a first convex sealing surface and a second convex sealing surface at its end portions. The first sealing surface faces away from the pressure relief valve spool and is provided for sealing with the external valve seat located, for example, at an opening or at a port of a pressure line in an installation cavity. The second sealing surface faces a stepped bore at the sealing side of the pressure relief valve spool and is designed for sealing with the smaller diameter of the stepped bore. The stepped bore is concentric with the longitudinal axis of the pressure relief valve spool and the pressure relief valve housing. Thus, due to the two convex sealing surfaces and its circular abutment, the poppet's rotational axis is tiltable/pivotable with respect to the longitudinal bore/longitudinal axis of the pressure valve housing and the pressure relief spool. Hence, in case of a misaligned assembly of the pressure relief valve housing with respect to an axis of the external valve seat the poppet and its rotational axis can tilt, whereas both convex sealing surfaces maintain the contact with their respective sealing contours, e.g. the protruding edge of the stepped bore in the pressure relief valve spool.

In a preferred embodiment of the invention the poppet is of a general stepped design, wherein the smaller diameter of the poppet fits in the bigger diameter of the stepped bore and seals with the smaller diameter of the stepped bore. Thereby, the bigger diameter of the poppet protrudes outside of the stepped bore in the pressure relief valve spool and the smaller diameter of the poppet extends into the bigger diameter area of the spool spout forming a gap with the same, in order to allow the tilting of the poppet. Preferably, the poppet is clamped in the region of its smaller diameter with the bigger diameter of the stepped bore of the pressure relief valve spool, e.g. by means of an undulated snap ring. The undulated or waved snap ring can be seated in a grove in an inner wall of the stepped bore of the pressure relief valve spool near the spout of the stepped bore and extends preferably into a corresponding grove in the poppet, for instance in the small diameter region of the poppet. According to the invention, the poppet is linked solely to the stepped bore of the pressure relief valve spool in such a way only that allows the poppet to tilt. As mounting conditions dictate that there has to be at least one force to press the pressure relief valve spool, and, at the same time the poppet against the external valve seat within the installation cavity in order to achieve a pressure relief function, no further fixing of the poppet to the spool is required. Furthermore, a physical fixing of the poppet to the pressure relief valve spool would impede the poppets ability to tilt, and would have an adverse effect with respect to this invention.

According to the invention, the region with the smaller outer diameter of the poppet, which enters in the bigger inner diameter of the stepped bore, is smaller than the inner diameter. This, in conjunction with the preferred undulation of the snap ring, allows the tilting of the poppet with respect to the longitudinal axis of the pressure relief valve spool. This tilting provides compensation for misalignments of the longitudinal axis of the pressure relief valve spool, respectively the valve housing, with respect to an axis of a valve seat of a pressure line in the installation cavity, to which the inventive pressure relief valve is attached to. As both sealing surfaces of the poppet are of a convex shape the exact orientation of the poppet with respect to the valve seat on a pressure line and, simultaneously, with respect to the longitudinal axis of the pressure relief valve is obtained in a self-positioning/orienting manner. Due to the convex shapes of the sealing surfaces on the poppet full circular abutment of the first sealing surface with the valve seat in the installation cavity and, at the same time, full circular abutment of the second sealing surface with the smaller opening of the stepped bore in the pressure relief valve spool is assured.

The full circular abutment is achieved preferably by providing two convex surfaces on the poppet with non-coinciding central points or non-coinciding points of rotation. If the two sealing surfaces would have coinciding centre points, a misalignment of the valve housing with respect to the valve seat may provoke only a translational displacement of the poppet and not the inventive simultaneous tilting motion, for compensation of a misalignment. Such a misalignment cannot be compensated with a rotation motion only. Furthermore, a sole translational displacement of the poppet would cause the poppet to lose, at least partially, the sealing contact with the valve seat or the longitudinal bore.

The final position and final orientation of the poppet with respect to the longitudinal axis of the pressure relief valve spool, and with respect to the external valve seat in the installation cavity, is determined by the deviations from the nominal specifications of the longitudinal axis of the pressure relief valve spool and the valve seat. From this at least a person skilled in the art derives that the inventive arrangement of a pressure relief valve with a double side convex poppet linked to the pressure relief valve spool allows for bigger tolerances in the manufacturing of the pressure relief valve itself, as well as for the valve seat in the installation cavity. The inventive pressure relief valve can be installed also on installation cavities with valve seat deviations, which are too big for known, state of the art pressure relief valves. Finally, the invention provides for lower manufacturing costs, not only of the pressure relief valve itself, since also for the installation cavity, in which the inventive pressure relief valve can be used.

The ability to tilt the poppet of the pressure relief valve allows for a reduction in the tolerance requirements with respect to positioning and alignment of the pressure relief valve housing at the hydraulic or pneumatic unit. Hence, not only angle deviations, since also deviations in parallelism and/or concentricity of the valve seat axis and the valve's longitudinal axis can be compensated. When the poppet is tilted the rotational axis of the poppet shows an angle different to 180° to both axis, the longitudinal axis of the pressure relief valve, respectively to the axis of the cylindrical bore in the pressure relief valve housing, and to the axis which is given by the valve seat onto which the pressure relief valve is seated in order to fulfil its pressure relief or check function. Thereby, according to the invention, the pressure relief functionality of the pressure relief valve is maintained unchanged with respect to common pressure relief valves.

In another embodiment of the inventive pressure relief valve the poppet can be designed in the general shape of a cylinder or a tube, whereas both tube ends are of convex shape serving as contact surfaces to seat and seal on the stepped bore of the pressure relief valve spool and on the valve seat in an installation cavity, for example. Thereby, it is preferred that the two centre points of the spherical surfaces do not coincide, i.e. do not fall together in one point, as this probably would impede a tilt motion. One single centre point of the two spherical surfaces would provide only one centre of rotation instead of allowing a tilt motion, i.e. rotation and translation simultaneously.

In implementing the invention the radii of the first sealing surface and the second sealing surface can be selected to be different. Thereby, it is of no importance for the inventive idea which of the two spherical surfaces shows the bigger radius.

In another embodiment of the invention the poppet further comprises a longitudinal through hole extending along the rotational axis of the poppet for guiding fluid into a pressure chamber located in the valve spool. For this purpose, the pressure relief valve spool can be of a hollow design, for instance, comprising a longitudinal bore in which a pilot valve or a proportional valve can be housed. So, for example, a pilot valve with an implemented pressure limiting function can be realized. Needless to say that each valve combination comprising a pressure relief valve and known to a person with skills in the relevant art can be implemented with the inventive pressure relief valve as well.

If a fluid pressure higher than the relief pressure acts upon the poppet, the poppet is moved together with pressure relief valve spool away from the valve seat. During this motion the poppet can change its orientation and/or alignment with respect to the valve seat and/or the longitudinal axis of pressure relief valve spool. However, if the high pressure falls again below the opening pressure of the pressure relief valve, the pressure relief valve closes and, due to the two convex sealing surfaces at the end regions of the poppet, the poppet is again automatically positioned and oriented by a tilt motion such that the sealing of both sealing contours, the one on the external valve seat and the one on the pressure relief valve spool, is assured. Preferably, as the centre points of the two convex sealing surfaces are spaced apart from each other, any misalignment of the valve housing with respect to the valve seat will cause an eccentric force to act with respect to at least one of the centre points of the poppet, which will cause the poppet to tilt into a position in which a full circular abutment of the convex surfaces is achieved.

In one embodiment of the invention, in order to shift and hold the pressure relief valve spool in the closing position of the pressure relief valve the first force on the first side of the valve spool is generated by a valve spring. This closing force can determine at the same time the opening force of the pressure relief valve, i.e. define the opening pressure value in conjunction with the surface size on the second side of the pressure relief valve spool, on which the pressure to be limited acts.

Most embodiments of pressure relief valves comprise a valve housing with an external thread for screwing the pressure valve into an installation cavity of a casing of a hydraulic unit, for example. Here, the inventive pressure relief valve allows a broader range of tolerances for both threads—the one on the valve housing as well as for the one in the installation cavity. The inventive pressure relief valve also allows a bigger position tolerance range than allowable with pressure relief valves known from the state of the art. The same applies to parallelism tolerances and to concentricity tolerances, as the tiltable poppet according to the invention provides for compensation of these manufacturing tolerances.

BRIEF DESCRIPTION OF THE DRAWINGS

In the following, exemplary embodiments of the invention are described in more detail with reference to the appended drawings which do not limit the scope of the inventive idea. All features of the disclosed and illustrated embodiments may be combined in any desired combination with one another within the scope of the invention. It is shown in.

DETAILED DESCRIPTION

Figure 1:
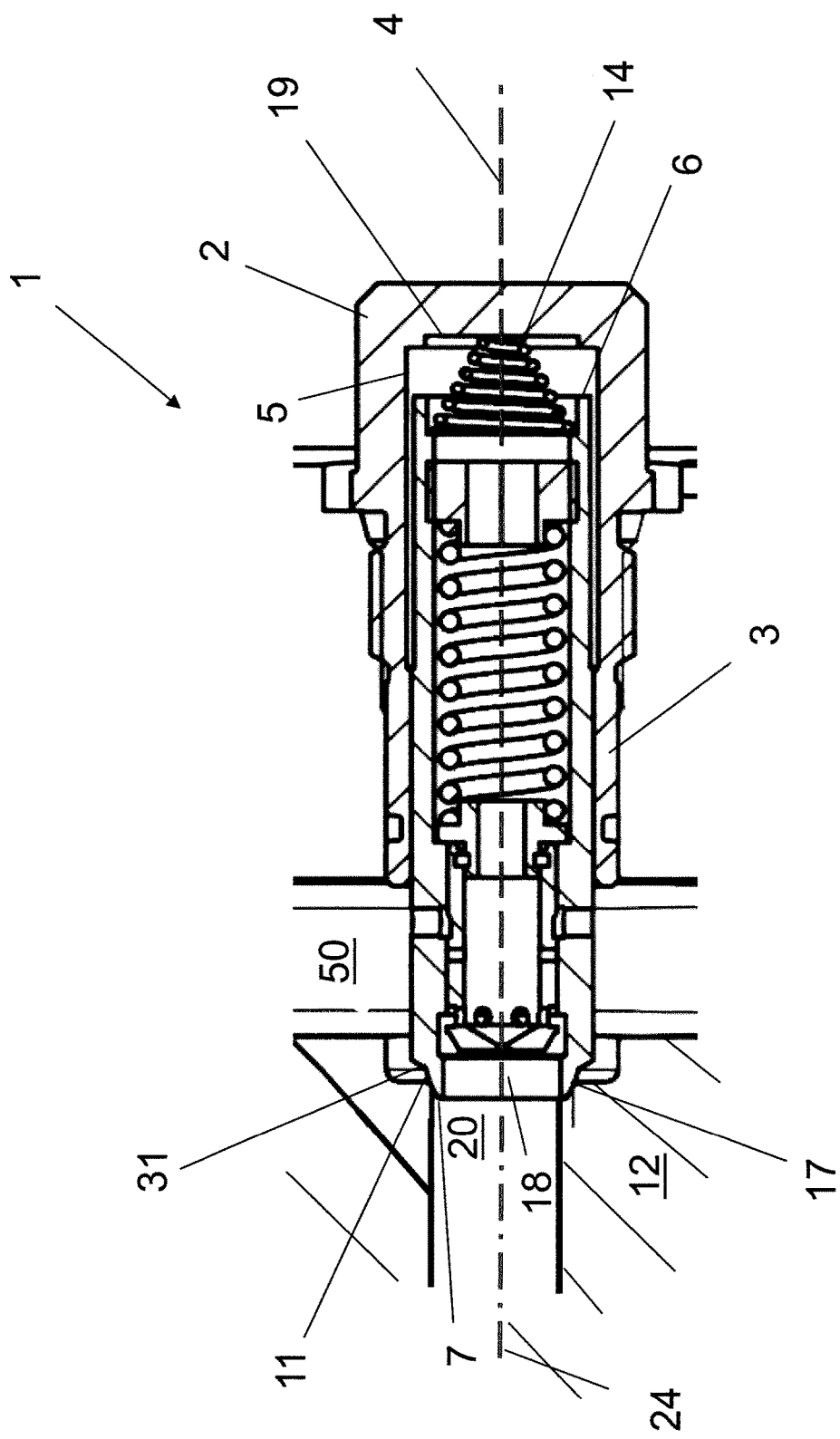
FIG. 1 a longitudinal section through a pressure valve according to the state of the art.

FIG. 1 shows a longitudinal section through a pressure relief valve 1 according to the state of the art. The valve housing 2 is of a general cylindrical shape with a longitudinal axis 4. A valve spool 3 is slidable between two positions in a cylindrical bore 5 of housing 2. In a first position, depicted in FIG. 1, the front end or spout 18 of the pressure relief valve spool 3 is directly in sealing contact with a valve seat 11 of a pressure line 20 in an installation cavity 12 of a hydraulic system, for example. Sealing contact is provided under the action of pressure relief valve spring 14 which acts on the actuation side 6 of pressure relief valve spool 3 and abuts on the bottom surface 19 of bore 5, thereby forcing pressure relief valve spool 3 towards the valve seat 11. In this first, closing position of the pressure relief valve spool 3 fluid flow is prevented between pressure line 20 and a fluid channel 50, as long as the pressure in pressure line 20 is lower than an opening pressure acting against the closing force of valve spring 14. Once the pressure level in pressure line 20 exceeds the opening pressure level at the sealing side 7 of the pressure relief valve spool 3, the pressure relief valve spool 3 is shifted into the valve housing 2 against the force of valve spring 14. Thereby, sealing surface 31 of pressure relief valve spool 3 loses contact with valve seat 11 and a fluid connection between pressure line 20 and fluid channel 50 is enabled, i.e. the pressure relief valve is opened.

As it can be derived from FIG. 1 an error of alignment of the longitudinal axis 4 of the pressure relief valve spool 3 with respect to the axis 24 of the valve seat 11 would cause a gap between the valve seat 11 and the sealing surface 31; e.g. a slight movement downwards in the plane of FIG. 1 would cause such a gap in the upper region of valve seat 11. Also, an error in para-llelism of the longitudinal axis 4 of the pressure relief valve spool 5, with respect to the valve seat axis 24 would cause a gap between sealing surface 31 on pressure relief valve spool 3 and sealing contour 17 on valve seat 11. If a gap between sealing surface 31 on pressure relief valve spool 3 and sealing contour 17 on valve seat 11 occurs, fluid flows (defined as fluid leakages) from the pressure line 20 to the fluid channel 50 and, normally, has to be replaced to pressure line 20 for the proper function of the hydraulic or pneumatic unit. If valve seat 11 cannot be sealed properly by sealing surface 31, the fluid pressure, too, in pressure line 20 is lower than it should be, which can cause malfunction or improper function of hydraulic or pneumatic unit as well.

Figure 2:
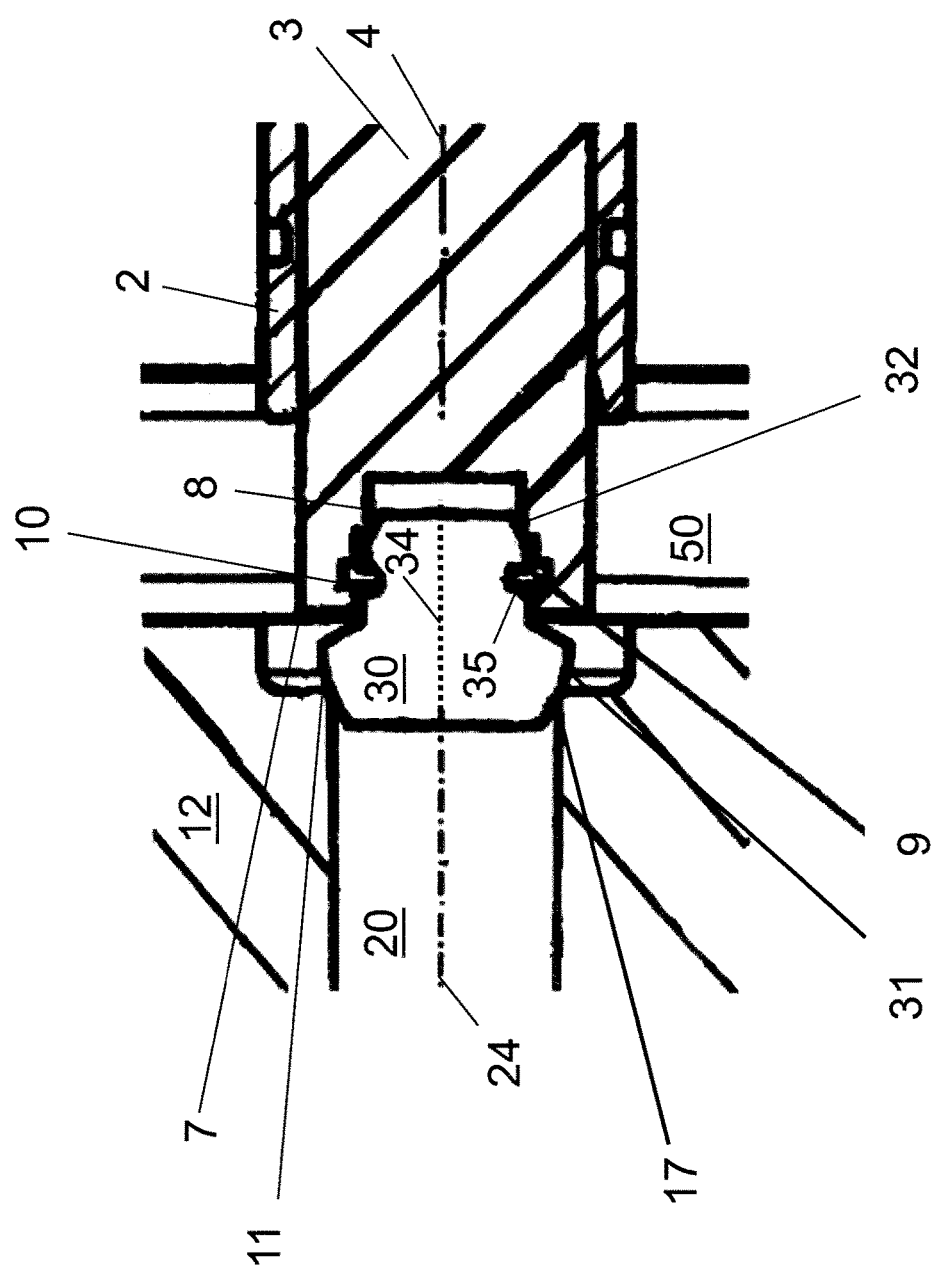
FIG. 2 a longitudinal section through a pressure relief valve according to the invention in a first embodiment.
Figure 3:
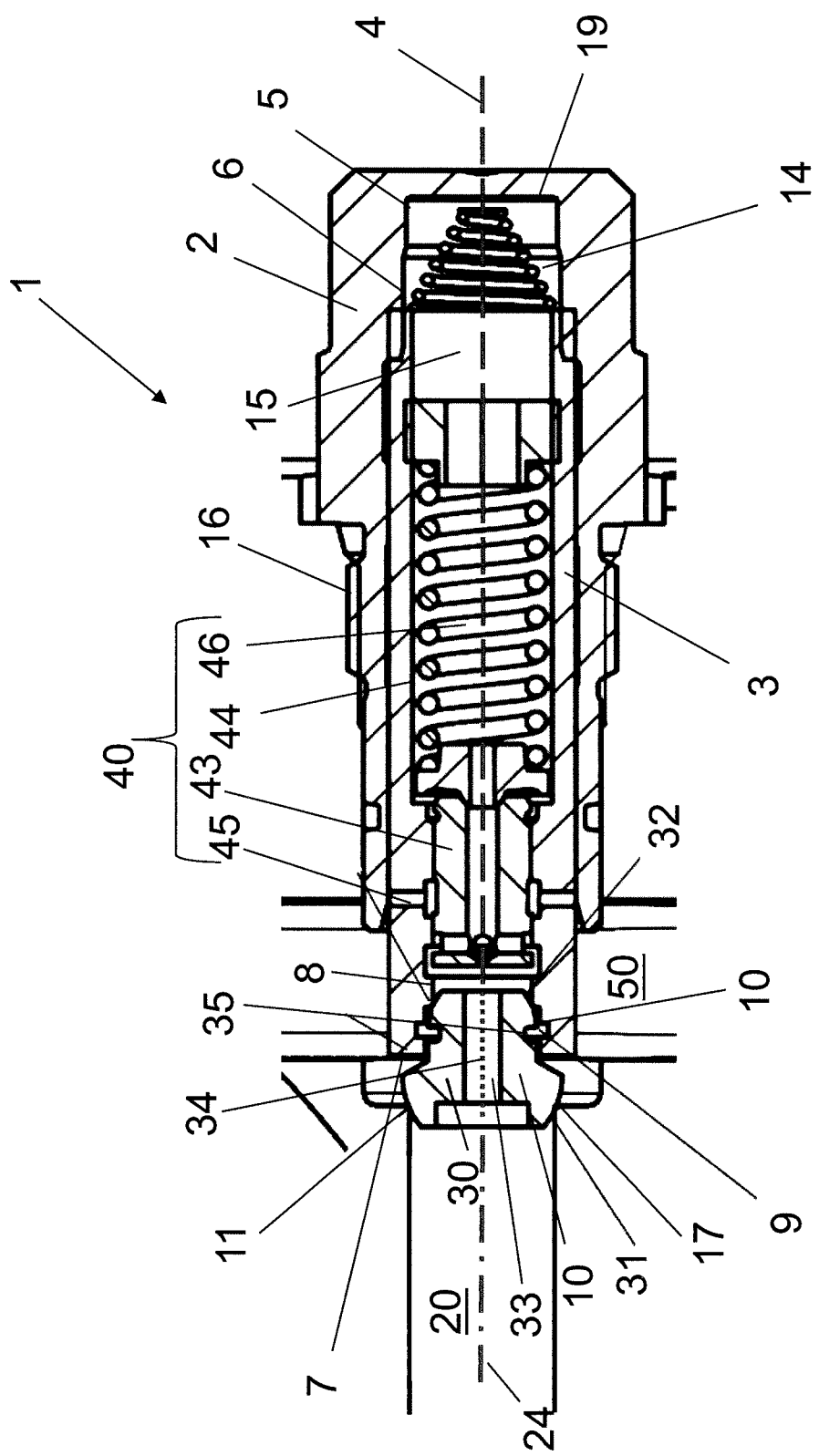
FIG. 3 a longitudinal section through a pressure relief valve according to the invention in a second embodiment

The pressure relief valves 1 according to invention as shown in FIG. 2 and FIG. 3 avoid these aforementioned fluid leakages. In the following Figures all reference numerals denoting similar constructive features will be retained for a better legibility.

In FIG. 2 a cross section through a first exemplary embodiment of a pressure valve 1 according to invention is shown in a longitudinal section. The main difference between the pressure valve 1 depicted in FIG. 1 and the pressure valve 1 of the invention lies in the configuration of the valve front section, where a poppet 30 is arranged in the stepped bore 8 of pressure relief valve spool 3 on the sealing side 7 at pressure relief valve spool 3. Thus, pressure relief valve spool 3 does not abut directly on valve seat 11, since poppet 30 abuts with sealing surface 31 against sealing contour 17 of valve seat 11. In this embodiment poppet 30 is of a cylindrical design showing on both end sides convex sealing surfaces 31 and 32. The sealing surfaces 31 and 32 according to FIG. 2 show a spherical contour, however, the sealing surfaces 31 and 32 can be of any convex contour. Between the two sealing surfaces 31 and 32 in the lateral area of poppet 30 in a groove 35 in poppet 30 an undulated snap ring 9 is provided for linking poppet 30 to pressure relief valve spool 3. For this purpose, in the stepped bore 8 of the pressure relief valve spool 3 another groove 10 is arranged, in which the undulated snap ring 9 engages for linking the poppet 30 to pressure relief valve spool 3. Instead of the undulated snap ring 9 any other manner of linking the poppet 30 to pressure relief valve spool 3 is covered by the scope of invention as long as poppet 30 is capable to tilt. So, e.g., an O-ring or the like can be used instead of undulated snap ring 9. Naturally, a person skilled in the art will find a plurality of solution to link the poppet 30 to pressure relief valve spool 3. Hence, all these solution are covered by the inventive idea.

Furthermore it can be derived from FIG. 2 too that poppet 30 will adopt a tilted position/orientation, if there is a misalignment of one of the three axes shown in FIG. 2: longitudinal axis 4 of pressure relief valve spool 3, rotational axis 34 of poppet 30 and valve seat axis 24 of valve seat 11 in installation cavity 12. At least for a person skilled in the art it is obvious that rotational axis 34 of poppet 30 will constitute in any case of alignment or misalignment the connection line between valve seat axis 24 and longitudinal axis 4 of pressure relief valve spool 3, i.e. rotational axis 34 of poppet 30 intersects in any case both axis as poppet 30 is tilted due to misalignments of the pressure relief valve spool 3 or the valve seat 11 or both of them.

FIG. 3 shows a further exemplary embodiment of the invention. Here, a pilot valve is integrated into the pressure relief valve spool 3 for guiding pressurized fluid from the pressure line 20 via through hole 33 in poppet 30 and pilot valve spool 43 to pilot pressure line 45 in pressure relief valve spool 3. As a person skilled in the art knows the general manner of functioning of a pilot pressure valve, a detailed description thereof is omitted. However, within the scope of the invention pilot valve 40 is capable to work properly even though the pressure relief valve longitudinal axis 4 is misaligned with respect to valve seat axis 24.

Preferably, pilot valve spool 43 comprises a through hole 44 along longitudinal axis 4, with which pressurized fluid can guided from pressure line 20 to pressure chamber 15 located on the actuating side 6 of pressure relief valve spool 3 and/or inside pressure relief valve housing 2. With the help of the pressurized fluid in pressure chamber 15 the pressure relief valve spool 3 can be pressed against valve seat 11 additionally to the spring force of valve spring 14. By this arrangement and in comparison to the embodiment of FIG. 2, a weaker valve spring 14 can be used to generate an appropriate closing force for pressure relief valve 1. Further, with the help of the pressure force a more reliable abutment of the poppet on valve seat 11 is achieved.

A person skilled in the art will recognize easily that an additional pressure force on the pilot valve arranged in the pressure relief valve spool 3 is necessary in order to obtain such an additional closing force. A mere longitudinal bore in the pressure relief valve spool 3, for example in the one of FIG. 2, will suffice to deliver pressurized fluid to a pressure chamber 15. However, when working with such an additional pressure force for holding closed the pressure relief valve, a seal between the pressure relief valve spool 3 and the cylindrical bore 5 in pressure relief valve housing 2 can be provided in order to avoid leakages.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A pressure relief valve comprising a valve housing, in which a double-side operable cylindrical pressure relief valve spool is housed slidable along a longitudinal axis of a cylindrical bore in the valve housing, wherein the pressure relief valve spool can be shifted into a first position by a first force acting on an actuating side of the pressure relief valve spool and can be shifted into a second position by a pressure force acting on a sealing side of the pressure relief valve spool, wherein on the sealing side of the pressure relief valve spool a double-sealing, rotational symmetric poppet is located having a rotational axis, a first convex sealing surface and a second convex sealing surface, wherein the first sealing surface facing away from the pressure relief valve spool is provided for sealing with an external valve seat and the second sealing surface facing to a stepped bore in the valve spool is provided for sealing with the smaller diameter of the stepped bore, wherein the poppet and the rotational axis of the poppet are tiltable with respect to the longitudinal axis of the cylindrical bore in the pressure valve housing.

2. The pressure relief valve according to claim 1, wherein the poppet is of a cylindrical or a stepped design.

3. The pressure relief valve according to claim 1, wherein the poppet is clamped in the stepped bore of the valve spool by means of an undulated snap ring.

4. The pressure relief valve according to claim 1, wherein the first sealing surface and/or the second sealing surface are spherical surfaces having equal or different radii.

5. The pressure relief valve according to claim 1, wherein the curvature of the first sealing surface is bigger than the curvature of the second sealing surface or vice versa.

6. The pressure relief valve according to claim 1, wherein the poppet comprises a longitudinal through hole for guiding fluid into a pressure chamber in the valve spool housing a pilot valve or a proportional valve.

7. The pressure relief valve according to claim 1, wherein the first force on the actuating side of the valve spool is generated by a valve spring.

8. The pressure relief valve according to claim 1, wherein the valve housing comprises an external thread for screwing the pressure relief valve into a casing.

9. The pressure relief valve according to claim 2, wherein the poppet is clamped in the stepped bore of the valve spool by means of an undulated snap ring.

10. The pressure relief valve according to claim 2, wherein the first sealing surface and/or the second sealing surface are spherical surfaces having equal or different radii.

11. The pressure relief valve according to claim 3, wherein the first sealing surface and/or the second sealing surface are spherical surfaces having equal or different radii.

12. The pressure relief valve according to claim 2, wherein the curvature of the first sealing surface is bigger than the curvature of the second sealing surface or vice versa.

13. The pressure relief valve according to claim 3, wherein the curvature of the first sealing surface is bigger than the curvature of the second sealing surface or vice versa.

14. The pressure relief valve according to claim 4, wherein the curvature of the first sealing surface is bigger than the curvature of the second sealing surface or vice versa.

15. The pressure relief valve according to claim 2, wherein the poppet comprises a longitudinal through hole for guiding fluid into a pressure chamber in the valve spool housing a pilot valve or a proportional valve.

16. The pressure relief valve according to claim 3, wherein the poppet comprises a longitudinal through hole for guiding fluid into a pressure chamber in the valve spool housing a pilot valve or a proportional valve.

17. The pressure relief valve according to claim 4, wherein the poppet comprises a longitudinal through hole for guiding fluid into a pressure chamber in the valve spool housing a pilot valve or a proportional valve.

18. The pressure relief valve according to claim 5, wherein the poppet comprises a longitudinal through hole for guiding fluid into a pressure chamber in the valve spool housing a pilot valve or a proportional valve.

19. The pressure relief valve according to claim 2, wherein the first force on the actuating side of the valve spool is generated by a valve spring.

20. The pressure relief valve according to claim 3, wherein the first force on the actuating side of the valve spool is generated by a valve spring.

* * * * *